United States Patent
Cyr et al.

(10) Patent No.: US 6,564,059 B1
(45) Date of Patent: May 13, 2003

(54) MODIFICATION OF LINK IDENTIFIER TO INCLUDE ROUTING LABEL THAT ALLOWS BASE STATION MESSAGE ROUTING TO SERVING PROCESSOR

(75) Inventors: Bernard Louis Cyr, Aurora, IL (US); Shi-Wan Lin, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 82 days.

(21) Appl. No.: 09/686,556

(22) Filed: Oct. 11, 2000

(51) Int. Cl.[7] .................................................. H04Q 7/20
(52) U.S. Cl. ........................ 455/445; 455/426; 455/403; 455/442; 455/422; 455/561
(58) Field of Search ................................ 455/445, 426, 455/403, 442, 561, 422

(56) References Cited

U.S. PATENT DOCUMENTS

| | | | | |
|---|---|---|---|---|
| 5,668,803 A | * | 9/1997 | Tymes et al. | 340/10.2 |
| 5,926,575 A | * | 7/1999 | Luijten et al. | 455/422 |
| 5,926,757 A | * | 7/1999 | Luijten et al. | 370/349 |
| 5,966,659 A | * | 10/1999 | McDonald et al. | 455/11.1 |
| 6,091,953 A | * | 7/2000 | Ho et al. | 455/432 |
| 6,129,604 A | * | 10/2000 | Maveddat et al. | 455/453 |

FOREIGN PATENT DOCUMENTS

| | | |
|---|---|---|
| WO | WO 98 59468 | 12/1998 |
| WO | WO 00 21319 | 4/2000 |
| WO | WO 01 91370 | 11/2001 |

* cited by examiner

Primary Examiner—William Trost
(74) Attorney, Agent, or Firm—Patti & Brill, LLC (57) ABSTRACT

A component of a system accesses a link identifier that is associated with a mobile station. A component of the system modifies the link identifier to include a routing label that allows a base station to route one or more messages to a serving processor.

3 Claims, 3 Drawing Sheets

MODIFICATION OF LINK IDENTIFIER TO INCLUDE ROUTING LABEL THAT ALLOWS BASE STATION MESSAGE ROUTING TO SERVING PROCESSOR

TECHNICAL FIELD

The invention in one embodiment relates generally to telecommunications and more particularly to support of messaging that is related to base stations.

BACKGROUND

One implementation of a network employs a frame relay interface between all base stations and serving general packet radio service support nodes. The frame relay interface generally comprises a point-to-point link. Each serving general packet radio service support node comprises a single processor. So, one-to-one relationships exist between the base stations and the serving general packet radio service support nodes. Typically, a mobile station sends a message to a closest one of the base stations for routing of the message to a serving general packet radio service support node that is dedicated exclusively to that particular one of the base stations.

As one shortcoming, such an implementation has undesirably limited capacity for a set amount of resources, since each base station requires the exclusive dedication of a serving general packet radio service support node to the base station. As another shortcoming, the implementation has disadvantageously limited reliability since an occurrence of unavailability of a serving general packet radio service support node that previously supported a particular base station, requires the implementation to have another serving general packet radio service support node available for exclusive dedication to the base station to effect continued processing support for messaging that is related to the particular base station.

Thus, a need exists for enhanced usability of a resource that supports messaging related to base stations. A further need exists for enhanced reliability of a resource that supports messaging related to base stations.

SUMMARY

Pursuant to one embodiment of the invention, shortcomings of the existing art are overcome and additional advantages are provided through the provision of modification of a link identifier to include a routing label that allows base station message routing to a serving processor.

The invention in one embodiment encompasses a method. A link identifier that is associated with a mobile station is accessed. The link identifier is modified to include a routing label that allows a base station to route one or more messages to a serving processor.

Another embodiment of the invention encompasses a system. The system includes a component that accesses a link identifier that is associated with a mobile station. The system includes a component that modifies the link identifier to include a routing label that allows a base station to route one or more messages to a serving processor.

A further embodiment of the invention encompasses an article. The article includes a computer-readable signal-bearing medium. The article includes means in the medium for accessing a link identifier that is associated with a mobile station. The article includes means in the medium for modifying the link identifier to include a routing label that allows a base station to route one or more messages to a serving processor.

DETAILED DESCRIPTION

In one embodiment of the invention, a link identifier associated with a mobile station is modified to include a routing label that allows a base station to route one or more messages to a serving processor.

A detailed discussion of one exemplary embodiment of the invention is presented herein, for illustrative purposes.

Figure 1:
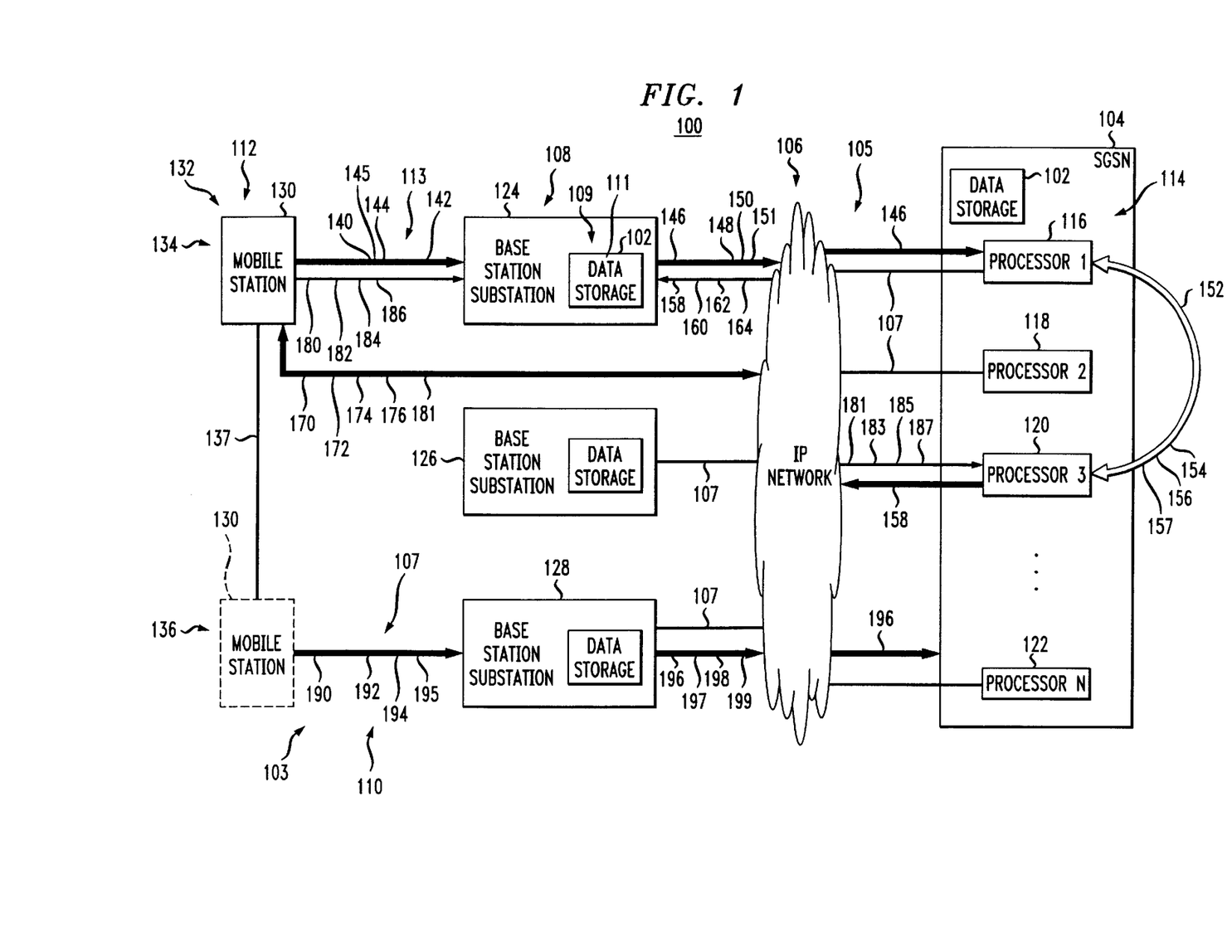
FIG. 1 is a functional block diagram of one example of a system that includes at least one mobile station, one or more passages, one or more messages, a plurality of base stations, a network, and a node that includes a plurality of serving processors, and further illustrates one example of communication of a mobile station with a first base station from a first location, and communication of the mobile station with a second base station from a second location.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102 such as one or more of a magnetic, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, node 104, network 106, one or more instances of passage 107, one or more instances of base station 108, one or more instances of mobile station ("MS") 112, and one or more instances of message 113.

Still referring to FIG. 1, system 100 in one example employs one or more instances of session 103. Session 103 in one example comprises an active (e.g., voice and data) communication connection, for example, among node 104 and one or more instances of base station 108 over network 106. An exemplary instance of session 103 comprises a packet data session.

Further referring to FIG. 1, node 104 in one example comprises a serving general packet radio service support node ("SGSN"). In one example, node 104 comprises a plurality of instances of processor 114. Processor 114 in one example comprises a serving processor. In a further example, processor 114 comprises a control processor. Exemplary instances of processor 114 comprise processors 116, 118, 120, and 122.

Again referring to FIG. 1, network 106 in one example conforms to a standard such as Internet protocol ("IP").

Referring still to FIG. 1, passage 107 in one example comprises a communications passage. In one example, passage 107 comprises a number of portions of one or more of an electrical path, an optical path, a wireless path, a wireline path, a hardware path, and a software path. One exemplary instance of passage 107 comprises an interface such as air interface 110. Air interface 110 in one example comprises an interface among one or more instances of base station 108 and one or more instances of mobile station 112.

Figure 3:
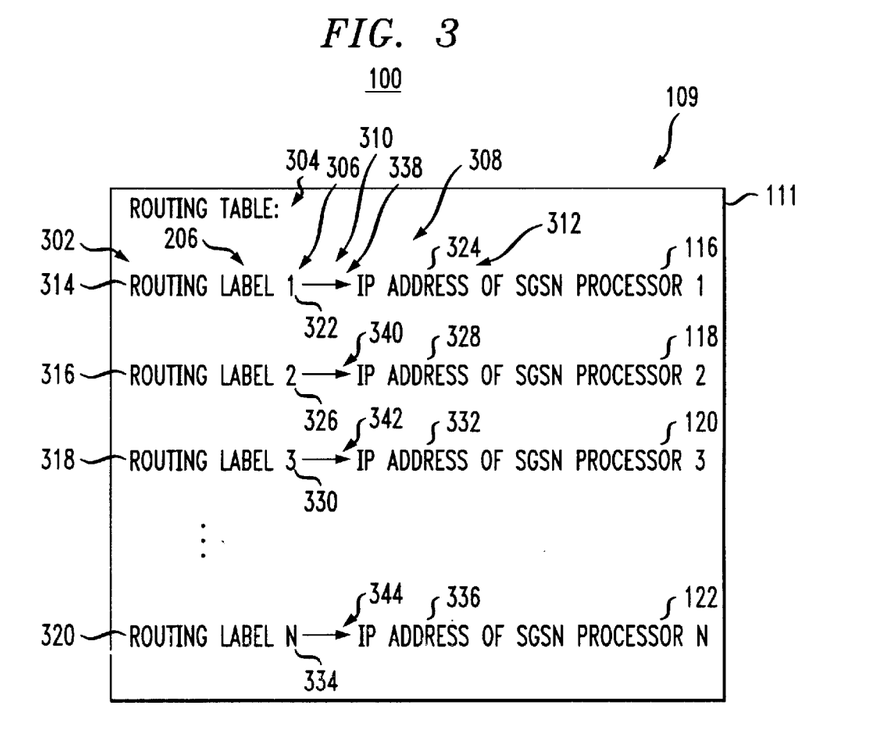
FIG. 3 represents illustrative details of one example of a table that is employed by one example of a base station of the system of FIG. 1.

Further referring to FIG. 1, base station 108 in one example comprises a base station subsystem ("BSS"). Exemplary instances of base station 108 comprise base stations 124, 126, and 128. For example, base station 108 comprises storage 109. Storage 109 in one example comprises an instance of recordable data storage medium 102. In one example, storage 109 comprises table 111. Table 111 in one example comprises a routing table. In one example, table 111 comprises one or more instances of entry 302 (FIG. 3). For example, blase station 108 employs table 111 in conjunction an indicator such as address indicator 105. Address indicator 105 in one example comprises an indication of an address (e.g., in system 100) of an instance of processor 114. In one example, address indicator 105 comprises an Internet protocol address of an instance of processor 114. System 100 in one example communicates address indicator 105 through employment of one or more instances of message 113. Additional illustrative details of examples of employment of table 111 and address indicator 105 are presented herein, for explanatory purposes.

Figure 4:
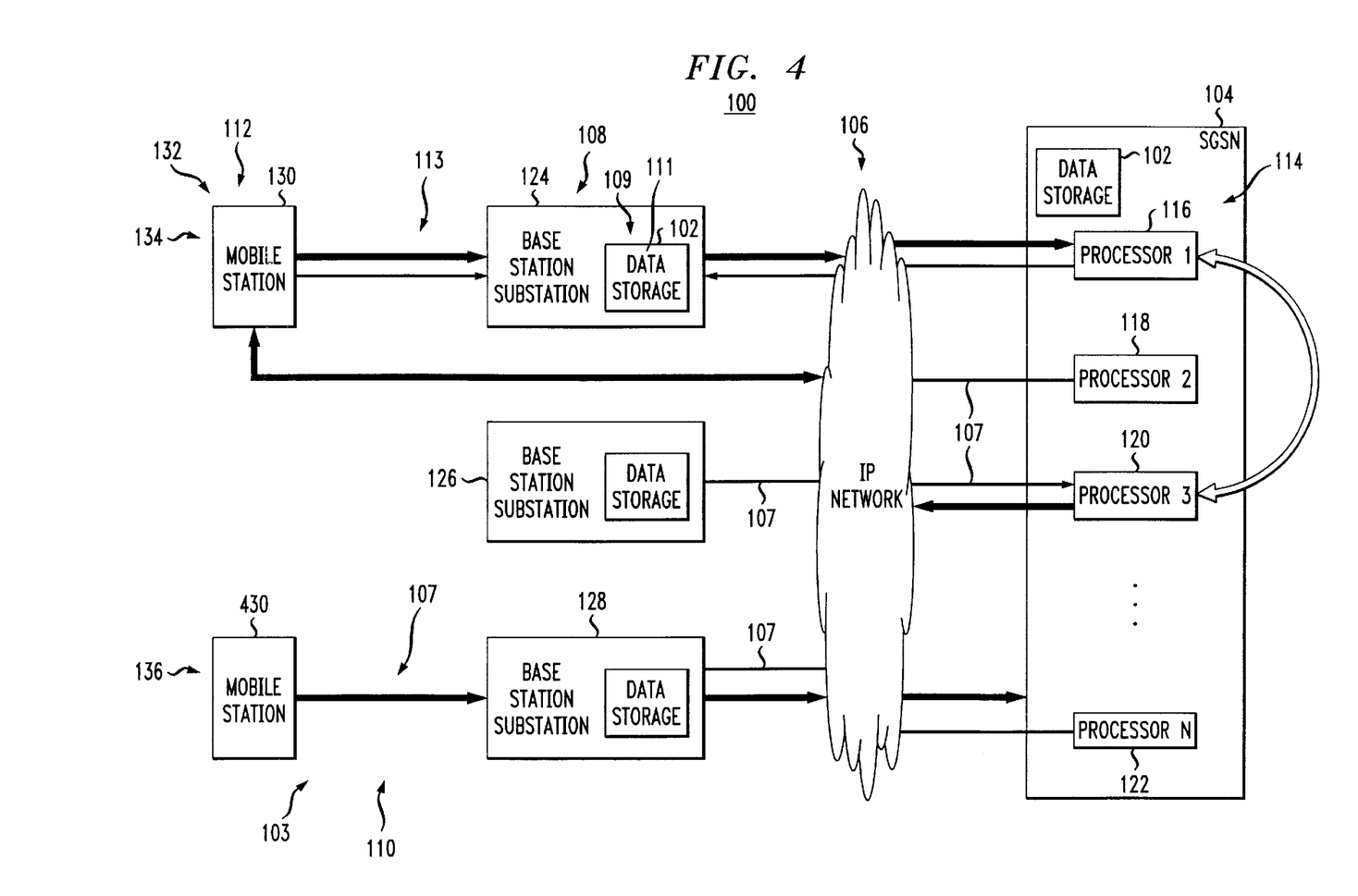
FIG. 4 illustrates one example of assignment of one serving processor to a mobile station upon an occurrence of unavailability of another serving processor that had been previously assigned to the mobile station, further illustrating one example of communication of a first mobile station with a first base station and communication of a second mobile station with a second base station, still further illustrating one example of assignment of a serving processor to a second mobile station notwithstanding that the serving processor has already been assigned to a first mobile station, and also illustrating one example of assignment of a first serving processor to a first mobile station and assignment of a second serving processor to a second mobile station of the system of FIG. 1.

Referring again to FIG. 1, mobile station 112 in one example comprises a mobile phone. Exemplary instances of mobile station 112 comprise mobile stations 130 and 430 (FIG. 4). In one example, mobile station 112 moves among a plurality of instances of location 132. Exemplary instances of location 132 comprise locations 134 and 136. For example, mobile station 112 (e.g., effectively) traverses a path such as exemplary path 137. Exemplary path 137 in one example comprises a path between locations 134 and 136. In one example, mobile station 112 travels along exemplary path 137 to move from location 134 to location 136.

Still referring to FIG. 1, message 113 in one example comprises a packet such as a data packet. Exemplary instances of message 113 comprise messages 140, 146, 152, 158, 170, 180, 181, 190, and 196.

Figure 2:
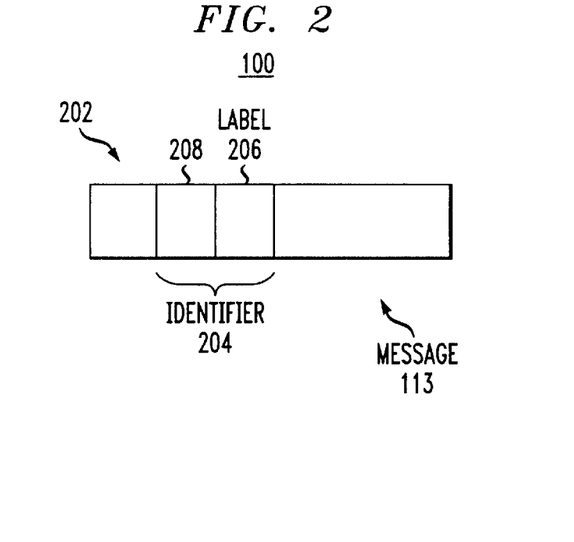
FIG. 2 represents illustrative details of one example of a message of the system of FIG. 1.

Now referring to FIGS. 1–2, in one example, message 113 comprises a number of instances of portion 202. Exemplary instances of portion 202 comprise identifier 204, label 206, and subportion 208. Identifier 204 in one example comprises a temporary logical link identifier ("TLLI"). In one example, identifier 204 comprises label 206. In a further example, identifier 204 comprises label 206 and subportion 208. Label 206 in one example comprises a routing label. In one example, label 206 comprises an octet, for example, an eight-bit byte. For instance, label 206 comprises a low-order octet of identifier 204. In a further example, subportion 208 comprises an octet. For instance, subportion 208 comprises a high-order octet of identifier 204.

Again referring to FIGS. 1–2, system 100 in one example employs and/or comprises an association between a distinct value for (e.g., subportion 208 of) identifier 204 and a certain instance of mobile station 112. For example, system 100 selects and/or employs a distinct value for (e.g., subportion 208 of) identifier 204, and system 100 associates the distinct value for (e.g., subportion 208 of) identifier 204 with a particular instance of mobile station 112. In a further example, system 100 employs and/or comprises an association between each instance of mobile station 112, of a plurality of instances of mobile station 112, and a distinct value for (e.g., subportion 208 of) identifier 204. For example, any particular instance of mobile station 112 (e.g., during an instance of session 103 of system 100) comprises an association with a value for (e.g., subportion 208 of) identifier 204 that is distinct from all other values for (e.g., subportion 208 of) identifier 204 that are associated with respective instances of mobile station 112 (e.g., during the instance of session 103 of system 100).

Still referring to FIGS. 1–2, in one example, (e.g., subportion 208 of) identifier 204 of a particular instance of message 113 serves to identify a certain instance of mobile station 112, among a plurality of instances of mobile station 112, as sender of that particular instance of message 113. In another example, (e.g., subportion 208 of) identifier 204 of a particular instance of message 113 serves to identify a certain instance of mobile station 112, among a plurality of instances of mobile station 112, as originator of the particular instance of message 113. For example, (e.g., subportion 208 of) identifier 204 of a particular instance of message 113 serves to identify an instance of mobile station 112, among a plurality of instances of mobile station 112, as sender of a certain (e.g., upstream) instance of message 113 that serves as a (e.g., direct or indirect) basis for the particular instance of message 113. In a further example, (e.g., subportion 208 of) identifier 204 of a certain instance of message 113 serves to identify an instance of mobile station 112, among a plurality of instances of mobile station 112, as sender of a particular (e.g., upstream) instance of message 113 that serves as a (e.g., direct or indirect) stimulus for a sending of the certain instance of message 113.

Referring now to FIG. 1, an instance of mobile station 112 in one example sends an instance of message 113 across air interface 110 to an instance of base station 108. For example, mobile station 130 sends message 140 across air interface 110 to base station 124.

Further referring to FIG. 1, message 140 in one example comprises an attach message. In one example, mobile station 130 sends message 140 upon arrival of mobile station 130 at system 100. For example, mobile station 130 sends message 140 to start an instance of session 103 of system 100. In one example, message 140 comprises an initial message that mobile station 130 sends (e.g., in an instance of session 103 of system 100) before an occurrence of an assignment that a particular instance of processor 114 is to serve as a serving processor for mobile station 130 (e.g., in the instance of session 103 of system 100).

Referring now to FIGS. 1–2, in one example, message 140 comprises value 142. For instance, value 142 serves as a value for identifier 204. In one example, value 142 comprises value 144. In a further example, value 142 comprises values 144 and 145. Value 144 in one example serves as a value for label 206. Value 145 in one example serves as a value for subportion 208.

Again referring to FIGS. 1–2, base station 124 in one example employs message 140 to obtain message 146. Message 146 in one example comprises value 148. For instance, value 148 serves as a value for identifier 204. In one example, value 148 is based on value 142 of message 140. For instance, value 148 equals value 142. Values 142 and 148 in one example comprise a same value for identifier 204.

Referring still to FIGS. 1–2, value 148 of message 146 in one example comprises value 150. In a further example, value 148 comprises values 150 and 151. For instance, value 150 serves as a value for label 206. In one example, value 150 is based on value 144 of message 140. For example, value 150 equals value 144. For instance, values 144 and 150 comprise a same value for label 206. Value 151 in one example serves as a value for subportion 208. In one example, value 151 is based on value 145 of message 140. For example, value 151 equals value 145. For instance, values 145 and 151 comprise a same value for subportion 208.

Still referring to FIGS. 1–2, in one example, base station 124 sends message 146 across network 106 to node 104. At node 104, in one example, an instance of processor 114 receives message 146. Illustrative details of further employment of message 146 in system 100 are presented herein, for explanatory purposes.

Referring again to FIGS. 1–2, in one example, an instance of processor 114 at node 104 employs one or more instances of message 113 to (e.g., directly or indirectly) assign an instance of processor 114 to serve as a serving processor for an instance of mobile station 112.

Referring still to FIGS. 1–2, in one example, an instance of processor 114 assigns an instance of processor 114 to serve as a serving processor for an instance of mobile station 112 advantageously based on, for example, relative workload among a plurality of instances of processor 114 and/or availability of one or more instances of processor 114. For example, an instance of processor 114 assigns a first instance of processor 114 to serve as a serving processor for a first instance of mobile station 112 and an instance of processor 114 assigns a second instance of processor 114 to serve as a serving processor for a second instance of mobile station 112 to advantageously promote equalization of workload between the first instance of processor 114 and the second instance of processor 114. In a further example, an instance of processor 114 assigns a particular instance of processor 114 to serve as a serving processor for an instance of mobile station 112 advantageously notwithstanding an existence of another assignment that the particular instance of processor 114 serve as a serving processor for one or more additional instances of mobile station 112. For example, an instance of processor 114 assigns a particular instance of processor 114 to serve as a serving processor for a first instance of mobile station 112 advantageously notwithstanding that an instance of processor 114 has already assigned the particular instance of processor 114 to serve as a serving processor for a second instance of mobile station 112. Additional illustrative details of assignment of an instance of processor 114 to serve as a serving processor for an instance of mobile station 112 and assignment of instances of processor 114 to serve as serving processors for instances of mobile station 112 are presented herein, for explanatory purposes.

Further referring to FIGS. 1–2, in one example, an instance of processor 114 modifies a portion of a value for (e.g., label 206 of) identifier 204 of an instance of message 113, to indicate an assignment of a certain instance of processor 114 to serve as a serving processor for a particular instance of mobile station 112. For example, an instance of processor 114 inserts and/or selects a certain (e.g., distinct) value as a value for label 206 of a number of (e.g., all) instances of message 113 that originate from a particular instance of mobile station 112. In one example, such a (e.g., distinct) value for label 206 advantageously serves to allow identification of a certain instance of processor 114 as a serving processor for the particular instance of mobile station 112.

Additional illustrative details of employment of message 146 in system 100 are now presented, for explanatory purposes. Referring to FIGS. 1–2, in one example, an instance of processor 114 such as processor 116 receives message 146 at node 104. Processor 116 in one example employs message 146 to obtain message 152. In one example, processor 116 employs message 152 to (e.g., directly or indirectly) assign an instance of processor 114 to serve as a serving processor for mobile station 130. In a further example, processor 116 cooperates with another instance of processor 114 (e.g., processor 120) to assign an instance of processor 114 to serve as a serving processor for mobile station 130. For example, processor 116 employs message 152 to (e.g., directly or indirectly) assign processor 120 to serve as a serving processor for mobile station 130. Additional illustrative details of examples of assignment of an instance of processor 114 (e.g., processor 120) to serve as a serving processor for mobile station 130 are presented herein, for explanatory purposes.

Again referring to FIGS. 1–2, message 152 in one example comprises value 154. For example, value 154 serves as a value for identifier 204. In one example, value 154 is based on value 148 of message 146.

Still referring to FIGS. 1–2, value 154 of message 152 in one example comprises value 156. In a further example, value 154 comprises values 156 and 157. For instance, value 156 serves as a value for label 206. In one example, value 156 is based on value 150 of message 146. Value 157 in one example serves as a value for subportion 208. In one example, value 157 is based on value 151 of message 146. For example, value 157 equals value 151. For instance, values 151 and 157 comprise a same value for subportion 208.

In one example, referring to FIGS. 1–2, value 154 of message 152 equals value 148 of message 146. For example, values 148 and 154 comprise a same value for identifier 204. In a further example, value 156 of message 152 equals value 150 of message 146. For instance, values 150 and 156 comprise a same value for label 206. Additional illustrative details of exemplary operation of system 100 in one example in which value 154 of message 152 equals value 148 of message 146 are presented further below, for explanatory purposes.

In another example, referring to FIGS. 1–2, value 154 of message 152 differs from value 148 of message 146. For example, values 148 and 154 comprise different values for identifier 204. For instance, a part of value 154 differs from a part of value 148. For example, value 156 of message 152 differs from value 150 of message 146. In one example, values 150 and 156 comprise different values for label 206. In a further example, value 154 differs from value 148 only to an extent that value 156 differs from value 150. For instance, value 157 of message 152 and value 151 of message 146 comprise a same value for subportion 208.

Referring further to FIGS. 1–2, processor 116 in one example selects and/or assign a certain (e.g., distinct) value as value 156 for label 206 of message 152, for example, to assign and/or identify processor 120 as a serving processor for mobile station 130. Value 156 in one example comprises a (e.g., new) value for label 206 that differs from value 150 for label 206 of message 146. In a further example, processor 116 selects value 156 to comprise a value for label 206 that is distinct from all other values for label 206, for example, that are employed and/or reserved during an instance of session 103 of system 100.

Still referring to FIGS. 1–2, in one example, value 156 for label 206 of message 152 comprises a low-order octet of value 154 for identifier 204 of message 152. In a further example, value 150 for label 206 of message 146 comprises a low-order octet of value 148 for identifier 204 of message 146. Processor 116 in one example selects value 156 to differ from value 150. In one example, processor 116 modifies value 150 to obtain value 156. In a further example, processor 116 selects value 154 for identifier 204 of message 152 to differ from value 148 for identifier 204 of message 146 only to an extent that value 156 for label 206 of message 152 differs from value 150 for label 206 of message 146.

Referring still to FIGS. 1–2, in one example, value 157 for subportion 208 of message 152 comprises a high-order octet of value 154. In a further example, value 151 for subportion 208 of message 146 comprises a high-order octet of value 148. For example, processor 116 selects value 157 to equal value 151. For instance, processor 116 selects values 151 and 157 to comprise a same value for subportion 208.

Further illustrative details of examples of employment of message 152 in system 100 are presented herein, for explanatory purposes.

Referring again to FIGS. 1–2, in one example, processor 116 sends address indicator 105 for processor 120 from message 152 and value 156 for label 206 to one or more instances of base station 108, for example, as an indication and/or assignment of processor 120 as a serving processor for mobile station 130. Address indicator 105 in one example comprises an indication of an address of processor 120 (e.g., in system 100). For example, address indicator 105 comprises an Internet protocol address of processor 120.

Still referring to FIGS. 1–2, in one example, processor 116 employs a first instance of portion 202 of a particular instance of message 113 to send value 156 of label 206, and employs a second instance of portion 202 of the particular instance of message 113 to send address indicator 105. In a further example, processor 116 sends value 156 and address indicator 105 to all instances of base station 108 in system 100. For example, processor 116 sends value 156 and address indicator 105 to base stations 124, 126, and 128.

Again referring to FIGS. 1–2, an exemplary instance of base station 108 employs table 111 to store value 156 of label 206 and address indicator 105, for example, that relates to processor 120. Additional illustrative details of one example of table 111 are presented further below, for explanatory purposes.

Further referring to FIGS. 1–2, processor 116 in one example sends message 152 to an instance of processor 114 such as processor 120. Processor 120 in one example employs message 152 to obtain message 158. Message 158 in one example comprises value 160. Value 160 in one example serves as a value for identifier 204. In one example, value 160 is based on value 154 of message 152. For example, value 160 equals value 154. For instance, values 154 and 160 comprise a same value for identifier 204.

Still referring to FIGS. 1–2, in one example, value 160 of message 158 comprises value 162. In a further example, value 160 comprises values 162 and 164. For instance, value 162 serves as a value for label 206. In one example, value 162 is based on value 156 of message 152. Value 164 in one example serves as a value for subportion 208. In one example, value 164 is based on value 157 of message 152. For example, value 164 equals value 157. For instance, values 157 and 164 comprise a same value for subportion 208. Additional illustrative details of exemplary employment of message 158 in system 100 are presented herein, for explanatory purposes.

In one example in which value 154 of message 152 equals value 148 of message 146, referring to FIGS. 1–2, processor 120 employs message 152 to obtain message 158. Processor 120 in one example employs message 158 to (e.g., directly or indirectly) assign an instance of processor 114 to serve as a serving processor for mobile station 130. In a further example, processor 120 cooperates with another instance of processor 114 (e.g., processor 116) to assign an instance of processor 114 to serve as a serving processor for mobile station 130. For example, processor 120 employs message 158 to (e.g., directly or indirectly) assign processor 120 to serve as a serving processor for mobile station 130.

Referring further to FIGS. 1–2, message 158 in one example comprises value 160. For example, value 160 serves as a value for identifier 204. In one example, value 160 is based on value 154 of message 152.

Again referring to FIGS. 1–2, value 160 of message 158 in one example differs from value 154 of message 152. For example, values 160 and 154 comprise different values for identifier 204. For instance, a part of value 160 differs from a part of value 154. For example, value 162 of message 158 differs from value 156 of message 152. In one example, values 156 and 162 comprise different values for label 206. In a further example, value 160 differs from value 154 only to an extent that value 162 differs from value 156. For instance, value 164 of message 158 and value 157 of message 152 comprise a same value for subportion 208.

Referring further to FIGS. 1–2, processor 120 in one example selects and/or assigns a certain (e.g., distinct) value as value 162 for label 206 of message 158, for example, to assign and/or identify processor 120 as a serving processor for mobile station 130. Value 162 in one example comprises a new value for label 206 that differs from value 156 for label 206 of message 152. In one example, processor 120 selects value 162 to comprise a value for label 206 that is distinct from all other values for label 206, for example, that are employed and/or reserved during an instance of session 103 of system 100.

Still referring to FIGS. 1–2, in one example, value 162 for label 206 of message 158 comprises a low-order octet of value 160 for identifier 204 of message 158. In a further example, value 156 for label 206 of message 152 comprises a low-order octet of value 154 for identifier 204 of message 152. Processor 120 in one example selects value 162 to differ from value 156. For example, processor 120 modifies value 156 to obtain value 162.

Referring still to FIGS. 1–2, in one example, processor 120 selects value 160 for identifier 204 of message 158 to differ from value 154 for identifier 204 of message 152 only to an extent that value 162 for label 206 of message 158 differs from value 156 for label 206 of message 152. In one example, value 164 for subportion 208 of message 158 comprises a high-order octet of value 160. In a further example, value 157 for subportion 208 of message 152 comprises a high-order octet of value 154. For example, processor 120 selects value 164 to equal value 157. For instance, processor 120 selects values 157 and 164 to comprise a same value for subportion 208.

Further illustrative details of exemplary employment of message 158 in system 100 are presented herein, for explanatory purposes.

Referring again to FIGS. 1–2, in one example, processor 120 sends address indicator 105 for processor 120 and value 162 for label 206 from message 158 to one or more instances of base station 108, for example, as an indication and/or assignment of processor 120 as a serving processor for mobile station 130. Processor 120 in one example employs a first instance of portion 202 of a particular instance of message 113 to send value 162 of label 206, and employs a second instance of portion 202 of the particular instance of message 113 to send address indicator 105. In a further example, processor 120 sends value 162 and address indicator 105 to all instances of base station 108 in system 100. For example, processor 120 sends value 162 and address indicator to base stations 124, 126, and 128.

Again referring to FIGS. 1–2, an exemplary instance of base station 108 employs table 111 to store value 162 of label 206 and address indicator 105, for example, that relates to processor 120. Additional illustrative details of one example of table 111 are presented further below, for explanatory purposes.

Referring still to FIGS. 1–2, processor 120 in one example sends message 158 across network 106 to one or more instances of base station 108. In one example, an exemplary instance of base station 108 such as base station 124 receives message 158. Base station 124 in one example employs message 158 to obtain message 170.

Again referring to FIGS. 1–2, message 170 in one example comprises value 172. For instance, value 172 serves as a value for identifier 204. In one example, value 172 is based on value 160 of message 158. For instance, value 172 equals value 160. For example, values 160 and 172 comprise a same value for identifier 204.

Still referring to FIGS. 1–2, value 172 in one example comprises value 174. In a further example, value 172 comprises values 174 and 176. For instance, value 174 serves as a value for label 206. In one example, value 174 is based on value 162 of message 158. For example, value 174 equals value 162. For instance, values 162 and 174 comprise a same value for label 206. Value 176 in one example serves a value for subportion 208. In one example, value 176 is based on value 164 of message 158. For example, value 176 equals value 164. For instance, values 164 and 176 comprise a same value for subportion 208.

Further referring to FIGS. 1–2, base station 124 in one example sends message 170 across air interface 110 to mobile station 130. In one example, value 176 for subportion 208 of message 170 serves to indicate that mobile station 130 comprises an originator of an instance of message 113 (e.g., message 140) that serves as a basis for message 170. Mobile station 130 in one example employs value 174 of message 170 to assign and/or employ a particular value for label 206 in all subsequent instances of message 113 that mobile station 130 sends in (e.g., an instance of session 103 of) system 100, for example, while processor 120 serves as a serving processor for mobile station 130. In one example, the particular value for label 206 that equals value 174 serves to advantageously allow an instance of base station 108 to route an instance message 113 from mobile station 130 (e.g., substantially directly) to processor 120. Additional illustrative details of exemplary (e.g., substantially direct) routing of an instance of message 113 to a specific instance of processor 114 through employment of a value for label 206 are presented further below, for explanatory purposes.

An exemplary discussion of illustrative details of one example of table 111 in system 100 is now presented, for explanatory purposes. Referring to FIGS. 1 and 3, table 111 in one example comprises one or more instances of entry 302. Exemplary instances of entry 302 comprise entries 314, 316, 318, and 320. Entry 302 in one example comprises one or more instances of indication 304. Exemplary instances of indication 304 comprise indications 306, 308, and 310. One exemplary instance of entry 302 comprises an instance of indication 306, an instance of indication 308, and an instance of indication 310.

Referring to FIGS. 1–3, indication 306 in one example comprises an indication of a value for label 206. In one example, indication 306 serves to identify a value for label 206, for example, that serves to allow routing in system 100 of a certain instance of message 113 (e.g., substantially directly) to an instance of processor 114 that comprises a serving processor for an instance of mobile station 112 that comprises an originator for the certain instance of message 113 or an originator for an instance of message 113 that comprises a (e.g., upstream) basis for the certain instance of message 113. Exemplary instances of indication 306 (e.g., for label 206) comprise values 322, 326, 330, and 334.

Referring to FIGS. 1 and 3, indication 308 in one example comprises address 312. Address 312 in one example comprises an Internet protocol address. For example, address 312 comprises an indication of a location of an instance of processor 114. Exemplary instances of address 312 comprise addresses 324, 328, 332, and 336. Address 324 in one example comprises an (e.g., indication of an) address for processor 116. Address 328 in one example comprises an (e.g., indication of an) address for processor 118. Address 332 in one example comprises an (e.g., indication of an) address for processor 120. Address 336 in one example comprises an (e.g., indication of an) address for processor 122.

Referring to FIGS. 2–3, an instance of indication 310 in one example serves to associate instances of indications 306 and 308. Indication 310 in one example comprises a pointer, as will be appreciated by those skilled in the art. In one example, an instance of indication 310 serves to associate a value for label 206 from an instance of indication 306, with a value of an instance of indication 308 that comprises address 312. Exemplary instances of indication 310 comprise indications 338, 340, 342, and 344.

Referring to FIGS. 1–3, at entry 314 of table 111 in one example indication 338 comprises an indication of an association between value 322 for label 206 and address 324 for processor 116. At entry 316 in one example indication 340 comprises an indication of an association of value 326 for label 206 with address 328 for processor 118. At entry 318 in one example indication 342 comprises an indication of an association between value 330 for label 206 and address 332 for processor 120. At entry 320 in one example indication 344 comprises an indication of an association between value 334 for label 206 and address 336 for processor 122.

Additional illustrative details of exemplary messaging and support thereof in system 100 are now presented, for explanatory purposes. Referring to FIGS. 1–2, mobile station 130 in one example prepares message 180. Message 180 in one example comprises value 182. For instance, value 182 serves as a value for identifier 204. In one example, value 182 comprises value 184. In a further example, value 182 comprises values 184 and 186. For instance, value 184 serves as a value for label 206. In one example, value 184 is based on value 174 of message 170. For example, value 184 equals value 174. For instance, values 174 and 184 comprise a same value for label 206. Mobile station 130 in one example advantageously selects value 184 for label 206 of message 180 to equal value 174 for label 206 of message 170, to allow an instance of base station 108 to employ value 184 for label 206 to desirably route message 180 (e.g., substantially directly) to an instance of processor 114 (e.g., processor 120) that comprises a serving processor for mobile station 130.

Referring still to FIGS. 1–2, value 186 of message 180 in one example serves as a value for subportion 208. In one example, mobile station 130 selects value 186 to comprise a value for subportion 208 that indicates mobile station 130 serves as an originator for message 180.

Again referring to FIGS. 1–2, in one example, mobile station 130 sends message 180 across air interface 110 to an instance of base station 108. For example, an instance of base station 108 such as base station 124 receives message 180.

Referring to FIGS. 1–3, base station 124 in one example employs table 111 for employment (e.g., evaluation) of value 184 of label 206 from message 180, for instance, to route message 180 across network 106 to a specific instance of processor 114 at node 104. For example, base station 124 traverses and/or scans and/or searches through one or more of entries 314, 316, 318, and 320 (e.g., to an extent needed in table 111) to identify and/or determine a match between value 184 for label 206 and a value for label 206 from values 322, 326, 330, and 334. In one particular example, no match exists between value 184 and any of values 322, 326, 330, and 334. In that particular example, base station 124 handles message 180 analogously to the exemplary handling of message 140 described herein. For example, base station 124 handles message 180 as an attach message.

In another example, referring to FIGS. 1–3, base station 124 determines that a match exists between value 184 for label 206 from message 180 and value 330 for label 206 at entry 318 in table 111. Therefore, base station 124 in one example employs indication 342 to identify and/or determine that address 332 for processor 120 serves as an address of an instance of processor 114 that comprises a serving processor for mobile station 130.

Referring to FIGS. 1 and 3, in one example, base station 124 employs message 180 to obtain message 181. In a further example, base station 124 routes message 181 (e.g., substantially directly) to processor 120. For example, base station 124 employs address 332 of entry 318 in table 111 to send message 181 across network 106 (e.g., substantially directly) to processor 120 as an instance of processor 114 at node 104 that comprises a serving processor for mobile station 130.

Referring to FIGS. 1–2, message 181 in one example comprises value 183. For instance, value 183 serves as a value for identifier 204. In one example, value 183 is based on value 182 of message 180. For instance, value 183 equals value 182. For example, values 182 and 183 comprise a same value for identifier 204.

Referring still to FIGS. 1–2, value 183 of message 181 in one example comprises value 185. In a further example, value 183 comprises values 185 and 187. For instance, value 185 of message 181 serves as a value for label 206. In one example, value 185 is based on value 184 of message 180. For example, value 185 equals value 184. For instance, values 184 and 185 comprise a same value for label 206. Value 187 of message 181 in one example serves as a value for subportion 208. In one example, value 187 is based on value 186 of message 180. For example, value 187 equals value 186. For instance, values 186 and 187 comprise a same value for subportion 208.

Referring to FIG. 1, processor 120 in one example performs processing of message 181. In a further example, processor 120 employs message 181 to obtain an instance of message 113 that processor 120 sends across network 106 to an instance of base station 108 that employs the instance of message of 113 to obtain another instance of message 113 for delivery to mobile station 130.

Again referring to FIG. 1, mobile station 130 in one example occupies locations 134 and 136 at different times. In one example, mobile station 130 from location 134 sends message 180 across air interface 110 to an instance of base station 108 such as base station 124 for (e.g., substantially direct) routing to an instance of processor 114 (e.g., processor 120) that comprises a serving processor for mobile station 130. An illustrative description of an exemplary instance of message 180 has been presented above, for explanatory purposes.

Referring to FIGS. 1–2, in one example, mobile station 130 prepares message 190 and from location 136 sends message 190 across air interface 110 to base station 128 for (e.g., substantially direct) routing to an instance of processor 114 (e.g., processor 120) that comprises a serving processor for mobile station 130. Message 190 in one example comprises value 192. For instance, value 192 serves as a value for identifier 204. In one example, value 192 comprises value 194. In a further example, value 192 comprises values 194 and 195. For instance, value 194 serves as a value for label 206. In one example, value 194 is based on value 174 of message 170. For example, value 194 equals value 174. For instance, values 174 and 194 comprise a same value for label 206.

Again referring to FIGS. 1–2, in one example, mobile station 130 advantageosly selects value 194 for label 206 of message 190 to equal value 174 for label 206 of message 170, to allow an instance of base station 108 to employ value 194 for label 206 to desirably route message 190 (e.g., substantially directly) to an instance of processor 114 (e.g., processor 120) that comprises a serving processor for mobile station 130.

Referring still to FIGS. 1–2, value 195 of message 190 in one example serves as a value for subportion 208. In one example, mobile station 130 selects value 195 to comprise a value for subportion 208 that indicates mobile station 130 serves as an originator for message 190. For example, mobile station 130 sends message 190 across air interface 110 to an instance of base station 108. In one example, an instance of base station 108 such as base station 128 receives message 190.

Referring to FIGS. 1–3, base station 128 in one example employs table 111 for employment (e.g., evaluation) of value 194 of label 206 from message 190, for instance, to route message 190 across network 106 to a specific instance of processor 114 at node 104. For example, base station 128 traverses and/or scans and/or searches through one or more of entries 314, 316, 318, and 320 (e.g., to an extent needed in table 111) to identify and/or determine a match between value 194 for label 206 and a value for label 206 from values 322, 326, 330, and 334. In one particular example, no match exists between value 194 and any of values 322, 326, 330, and 334. In that particular example, base station 128 handles message 190 analogously to the exemplary handling of message 140 described herein. For example, base station 128 handles message 190 as an attach message.

In another example, referring to FIGS. 1–3, base station 128 determines that a match exists between value 194 for label 206 from message 190 and value 330 for label 206 at entry 318 in table 111. Therefore, base station 128 in one example employs indication 342 to identify and/or determine that address 332 for processor 120 serves as an address of an instance of processor 114 that comprises a serving processor for mobile station 130.

Referring to FIGS. 1 and 3, in one example, base station 128 employs message 190 to obtain message 196. In a further example, base station 128 routes message 196 (e.g., substantially directly) to processor 120. For example, base station 128 employs address 332 of entry 318 in table 111 to send message 196 across network 106 (e.g., substantially directly) to processor 120 as an instance of processor 114 at node 104 that comprises a serving processor for mobile station 130.

Referring to FIGS. 1–2, message 196 in one example comprises value 197. For instance, value 197 serves as a value for identifier 204. In one example, value 197 is based on value 192 of message 190. For instance, value 197 equals value 192. For example, values 192 and 197 comprise a same value for identifier 204.

Referring still to FIGS. 1–2, value 197 of message 196 in one example comprises value 198. In a further example, value 197 comprises values 198 and 199. For instance, value 198 of message 196 serves as a value for label 206. In one example, value 198 is based on value 194 of message 190. For example, value 198 equals value 194. For instance, values 194 and 198 comprise a same value for label 206. Value 199 of message 196 in one example serves as a value for subportion 208. In one example, value 199 is based on value 195 of message 190. For example, value 199 equals value 195. For instance, values 195 and 199 comprise a same value for subportion 208.

Now referring to FIGS. 2 and 4, processor 120 in one example comprises a serving processor for mobile station 130, for example, during a first instance of session 103 of system 100. In one example, processor 120 becomes unavailable to serve as a serving processor for mobile station 130. For example, processor 120 notifies an instance of processor 114 that processor 120 is unavailable to serve as a serving processor for mobile station 130. In one example, processor 120 employs an instance of message 113 to notify processor 116 that processor 120 is unavailable to serve as a serving processor for mobile station 130. In a further example, an instance of processor 114 determines that processor 120 is unavailable to serve as a serving processor for mobile station 130.

Referring still to FIGS. 2 and 4, for example, an instance of processor 114 such as processor 116 employs an instance of message 113 to determine that processor 120 is unavailable to serve as a serving processor for mobile station 130. For example, processor 116 polls processor 120 to obtain an update and/or status of availability of processor 120 to serve as a serving processor for mobile station 130. In one example, should processor 120 fail to respond to the poll from processor 116 (e.g., within a certain time interval) then processor 116 determines that processor 120 is unavailable to serve as a serving processor for mobile station 130.

Again referring to FIGS. 2 and 4, in one example in which processor 116 determines that processor 120 is unavailable to serve as a serving processor for mobile station 130, processor 116 assigns an instance of processor 114 other than processor 120 to serve as a serving processor for mobile station 130. For example, processor 116 assigns processor 118 to serve as a serving processor for mobile station 130, for example, during a second instance of session 103 of system 100. Analogously to the illustrative description above of exemplary employment of processor 120 as a serving processor for a mobile station 130, system 100 in one example employs processor 118 to serve as a serving processor for a mobile station 130.

Still referring to FIGS. 2 and 4, in one example, mobile station 430 sends an instance of message 113 (e.g., that comprises an attach message) across air interface 110 to base station 128. Analogously to the illustrative description above of exemplary handling and/or treatment by base station 124 of message 140 that comprises an attach message sent by mobile station 130 (e.g., from location 134) across air interface 110, base station 128 in one example sends an instance of message 113 across network 106 to node 104 upon receipt of the instance of message 113 (e.g., that comprises an attach message) from mobile station 430.

Again referring to FIGS. 2 and 4, node 104 in one example employs one or more instances of processor 114 to assign an instance of processor 114 to serve as a serving processor for mobile station 430. In one example, one or more instances of processor 114 serve to assign processor 120 to serve as a serving processor for mobile station 430 notwithstanding that processor 120 already serves as a serving processor for mobile station 130.

In another example, referring to FIGS. 2 and 4, one or more instances of processor 114 such as processor 116 and/or processor 118 assign processor 118 to serve as a serving processor for mobile station 430 advantageously based on, for example, relative workload between processors 118 and 120 and/or availability of processor 118. For example, processor 116 and/or processor 120 assign processor 120 to serve as a serving processor for mobile station 130, and processor 116 and/or processor 118 assign processor 118 to serve as a serving processor for mobile station 430 to advantageously promote equalization of workload between processors 118 and 120. Analogously to the illustrative description above of exemplary employment of processor 120 to serve as a serving processor for a mobile station 130, system 100 in one example employs processor 118 to serve as a serving processor for a mobile station 430.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising the steps of:
   accessing a link identifier that is associated with a mobile station;
   assigning a processor of a plurality of processors to serve as a serving processor for the mobile station based on relative workload among the plurality of processors; and modifying the link identifier to include a routing label that allows a base station to route one or more messages to the serving processor;

wherein the step of modifying the link identifier to include the routing label that allows the base station to route the one or more messages to the serving processor comprises the step of selecting the routing label to comprise a routing label that allows any base station of a plurality of base stations to route the one or more messages to the serving processor;

wherein the step of selecting the routing label to comprise the routing label that allows any base station of the plurality of base stations to route the one or more messages to the serving processor comprises the step of selecting the routing label to comprise a routing label that allows a first base station of the plurality of base stations to route to the serving processor a first message that is associated with the mobile station, and that allows a second base station of the plurality of base stations to route to the serving processor a second message that is associated with the mobile station;

wherein the link identifier comprises a first link identifier, wherein the mobile station comprises a first mobile station, wherein the serving processor comprises a first serving processor, wherein the routing label that allows the first base station of the plurality of base stations to route to the first serving processor the first message that is associated with the first mobile station, and that allows the second base station of the plurality of base stations to route to the serving processor the second message that is associated with the first mobile station comprises a first routing label, the method further comprising the steps of:

accessing a second link identifier that is associated with a second mobile station; and modifying the second link identifier to include a second routing label that allows the first base station to route to a second serving processor a third message that is associated with the second mobile station, and that allows the second base station to route to the second serving processor a fourth message that is associated with the second mobile station.

2. A system, comprising:

a component that accesses a link identifier that is associated with a mobile station;

a component that assigns a processor of a plurality of processors to serve as a serving processor for the mobile station based on relative workload among the plurality of processors; and a component that modifies the link identifier to include a routing label that allows a base station to route one or message to the serving processor;

wherein the routing label allows any base station of a plurality of base stations to route the one or more messages to the serving processor;

wherein the routing label allows a first base station of the plurality of base stations to route to the serving processor a first message that is associated with the mobile station, and allows a second base station of the plurality of base stations to route to the serving processor a second message that is associated with the mobile station;

wherein the link identifier comprises a first link identifier, wherein the mobile station comprises a first mobile station, wherein the serving processor comprises a first serving processor, wherein the routing label comprises a first routing label, the system further comprising:

a component that accesses a second link identifier that is associated with a second mobile station; and a component that modifies the second link identifier to include a second routing label that allows the first base station to route to a second serving processor a third message that is associated with the second mobile station, and that allows the second base station to route to the second serving processor a fourth message that is associated with the second mobile station.

3. An article, comprising:

a computer-readable signal-bearing medium;

means in the medium for accessing a link identifier that is associated with a mobile station;

means in the medium for assigning a processor of a plurality of processors to serve as a serving processor for the mobile station based on relative workload among the plurality of processors; and means in the medium for modifying the link identifier to include a routing label that allows a base station to route one or more messages to the serving processor, wherein the means in the medium for modifying the link identifier to include the routing label that allows the base station to route the one or more messages to the serving processor comprises means in the medium for selecting the routing label to comprise a routing label that allows any base station of a plurality of base stations to route the one or more messages to the serving processor;

wherein the means in the medium for selecting the routing label to comprise the routing label that allows any base station of the plurality of base stations to route the one or more messages to the serving processor comprises means in the medium for selecting the routing label to comprise a routing label that allows a first base station of the plurality of base stations to route to the serving processor a first message that is associated with the mobile station, and that allows a second base station of the plurality of base stations to route to the serving processor a second message that is associated with the mobile station;

wherein the link identifier comprises a first link identifier, wherein the mobile station comprises a first mobile station, wherein the serving processor comprises a first serving processor, wherein the routing label that allows the first base station of the plurality of base stations to route to the first serving processor the first message that is associated with the first mobile station, and that allows the second base station of the plurality of base stations to route to the serving processor the second message that is associated with the first mobile station comprises a first routing label, the article further comprising:

means in the medium for accessing a second link identifier that is associated with a second mobile station; and means in the medium for modifying the second link identifier to include a second routing label that allows the first base station to route to a second serving processor a third message that is associated with the second mobile station, and that allows the second base station to route to the second serving processor a fourth message that is associated with the second mobile station.

* * * * *